United States Patent [19]
Frisbie et al.

[11] Patent Number: 4,785,925
[45] Date of Patent: Nov. 22, 1988

[54] MECHANICAL CLUTCH

[75] Inventors: Milo W. Frisbie; Mavin C. Swapp, both of Mesa, Ariz.

[73] Assignee: Motorola Inc., Schaumburg, Ill.

[21] Appl. No.: 101,305

[22] Filed: Sep. 24, 1987

[51] Int. Cl.⁴ ............................................. F16D 11/02
[52] U.S. Cl. .................... 192/17 R; 192/28; 192/71; 192/101
[58] Field of Search ............... 192/17 R, 28, 39, 71, 192/89 R, 101, 108; 403/324, 325

[56] References Cited

U.S. PATENT DOCUMENTS

| | | | |
|---|---|---|---|
| 76,712 | 4/1868 | Castle | 192/71 X |
| 82,674 | 10/1868 | Ammidown | 192/71 |
| 1,765,695 | 6/1930 | Owens | 192/71 X |
| 2,062,989 | 12/1936 | Castricone | 192/28 X |
| 2,117,947 | 5/1938 | De Rome et al. | 403/324 X |
| 2,304,038 | 12/1942 | Thompson | 403/324 |
| 2,907,432 | 10/1959 | Strickland et al. | 192/71 |
| 3,275,110 | 9/1966 | Lasky | 192/28 |
| 4,427,035 | 1/1984 | Hintsch et al. | 192/28 X |
| 4,730,641 | 3/1988 | Schwarz | 192/28 X |

Primary Examiner—Rodney H. Bonck
Attorney, Agent, or Firm—Joe E. Barbee; Raymond J. Warren

[57] ABSTRACT

A mechanical clutch is described having a spring loaded clutch ring with a drive pin extending through a hole in a hub of a wheel and into a notch of a drive shaft. When pressure is exerted on the outer portion of the drive wheel, the spring is compressed and the drive pin is removed from the notch of the drive shaft. This allows the drive shaft to turn freely within the wheel and hub.

8 Claims, 4 Drawing Sheets

MECHANICAL CLUTCH

BACKGROUND OF THE INVENTION

The present invention relates, in general, to clutches, and, more particularly, to mechanical clutches.

Clutches are well known in the art and are, in general, either electrical or mechanical in type. A need has developed in the industry for a small, compact clutch to be utilized in areas having limited space availability. In addition, it is preferable that such a clutch have as few moving parts as practicable.

Accordingly, it is an object of the present invention to provide a mechanical clutch that obtains the above objectives.

A further object of the present invention is to provide a mechanical clutch which is compact.

Another object of the present invention is to provide a mechanical clutch which has few moving parts.

The above and other objects and advantages of the present invention are provided by the mechanical clutch described herein.

SUMMARY OF THE INVENTION

A particular embodiment of the present invention consists of a mechanical clutch comprising: a shaft having a notch disposed therein; a wheel having a hub and being disposed about said shaft, said hub defining a first hole extending from an outer wall to an inner wall and a second hole extending from said outer wall toward said inner wall; a clutch ring being disposed about said outer wall of said hub of said wheel; a drive pin being coupled to said clutch ring and being disposed such that when said clutch is engaged, said drive pin extends through the first hole of said hub into the notch of said shaft, and when said clutch is disengaged, said drive pin extends partly into the first hole of said hub; spring means for exerting a force on said clutch ring causing said clutch to be engaged, said spring means being disposed within the second hole of said hub and contacting an inner wall of said clutch ring; and drive means for exerting a force on said clutch ring causing said clutch to be disengaged, said drive means being disposed to exert a force on an outer wall of said clutch ring.

DETAILED DESCRIPTION OF THE INVENTION

Figure 2:
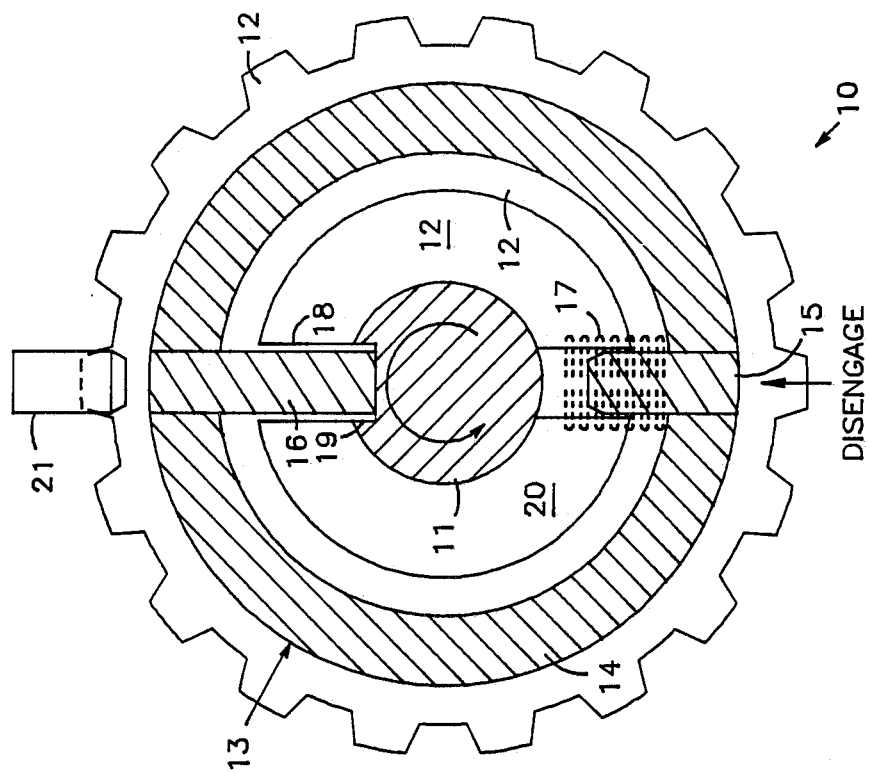
FIGS. 1 and 2 are a side view and cross sectional front view of a mechanical clutch embodying the present invention.

Referring to the figures, a mechanical clutch, generally designated 10, is illustrated. As shown, clutch 10 consists mainly of a shaft 11, a wheel 12, and a clutch mechanism 13. Shaft 11 is generally coupled to a drive mechanism, not shown, and may be driven continuously or intermittently (e.g. stepped). Wheel 12 is disposed loosely about shaft 11 such that, without external interference, shaft 11 will spin freely within wheel 12. As shown wheel 12 is illustrated as: a gear in FIGS. 1 and 2; and a pulley in FIGS. 4, 5, 6 and 7. It should be noted here that wheel 12 may also be a sprocket or any similar item.

Clutch mechanism 13 consists of a ring 14, a guide pin 15, a drive pin 16, and a spring 17. As shown in FIG. 2, clutch 10 is in an engaged state. In this state spring 17 is expanded pushing ring 14 away from a hub 20 of wheel 12. This causes drive pin 16 to extend through an opening 18 of hub 20 and into a notch 19 in shaft 11. Which causes clutch mechanism 13 to engage wheel 12 to shaft 11.

Figure 1:
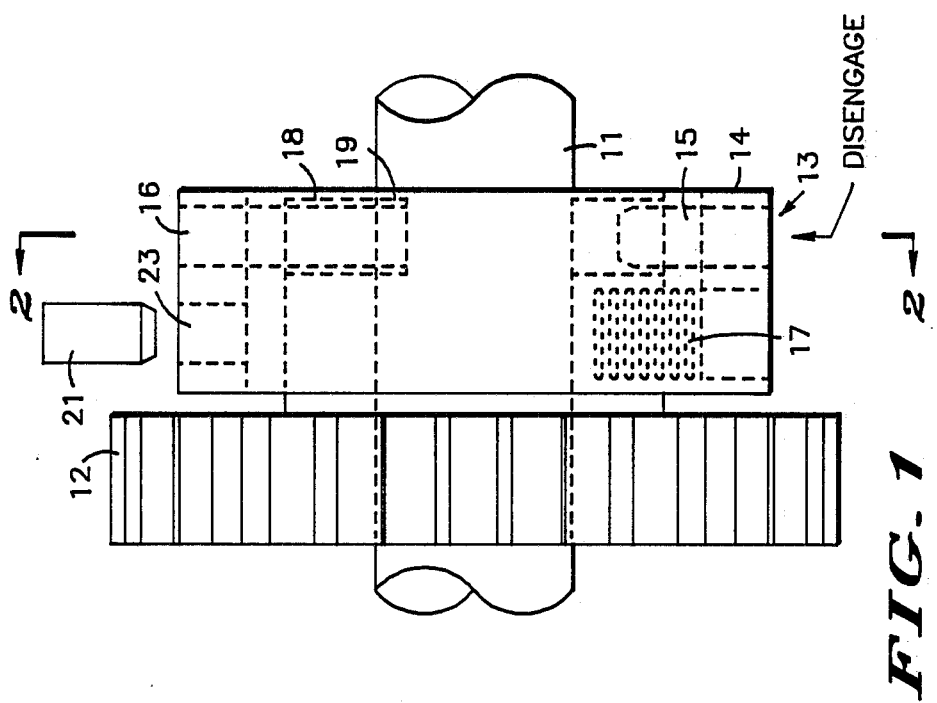
Figure 3:
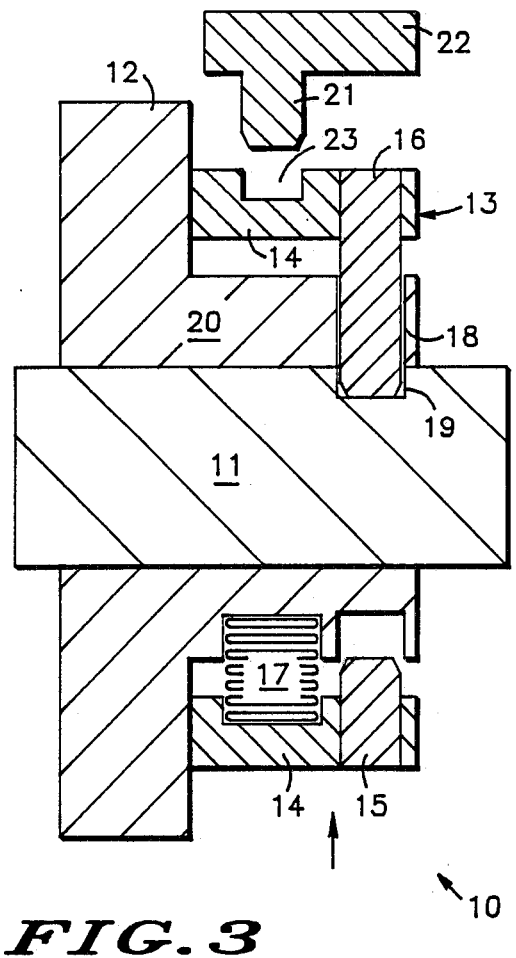
FIG. 3 is a cross sectional side view of the mechanical clutch embodying the present invention.

To disengage clutch mechanism 13, a force is exerted in the direction of the disengage arrow of FIGS. 1 and 2. When a force is exerted in this direction and when device 10 is oriented as shown in FIGS. 1 and 2, spring 17 will be compressed and drive pin 16 will be extended away from and out of notch 19 of shaft 11. This disengages clutch mechanism 13 and wheel 12 from the shaft 11.

In addition to the above, guide pin 15 serves to maintain the position of ring 14 relative to hub 20 and to absorb a portion of the rotational stresses that would otherwise be exerted upon drive pin 16. This will prevent ring 14 from becoming twisted with respect to hub 20. Further, a lock pin 21 is fixed to an external brace 22 such that when disengaged, pin 21 will extend into a hole 23 of ring 14. This holds device 10 in place and prevents any friction generated between shaft 11 and wheel 12 from causing wheel 12 to rotate.

Figure 4:
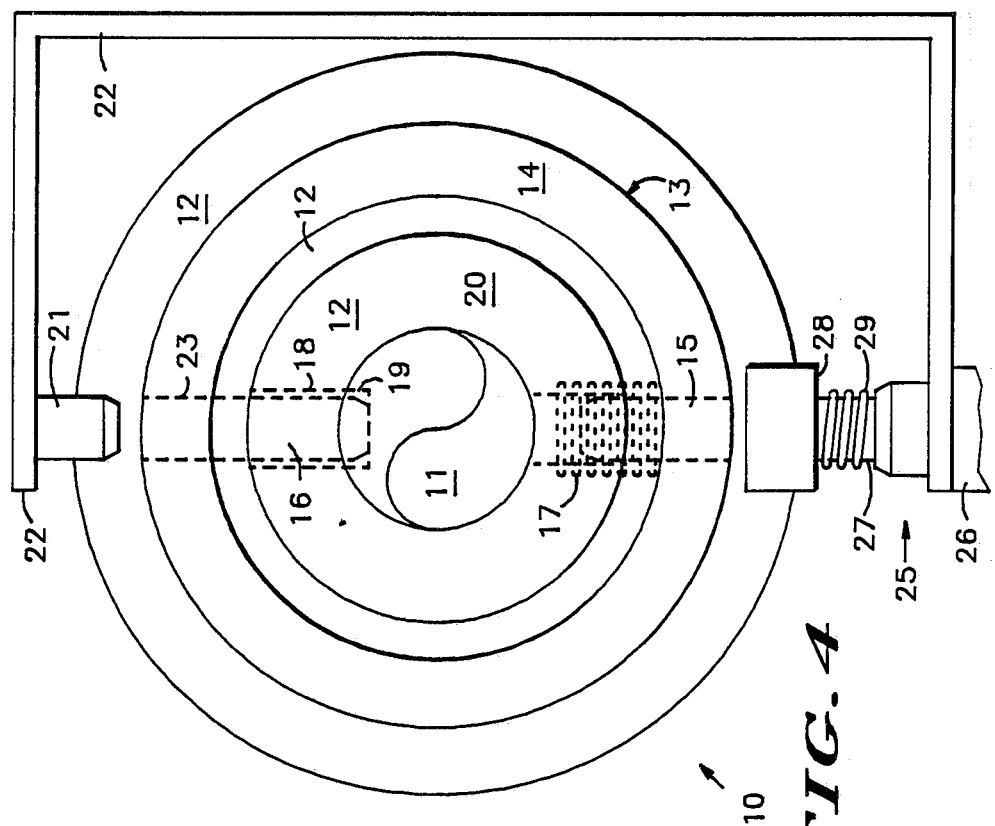
FIGS. 4 and 5 are front and side views, respectively, of the mechanical clutch embodying the present invention with an actuating solenoid.
Figure 5:
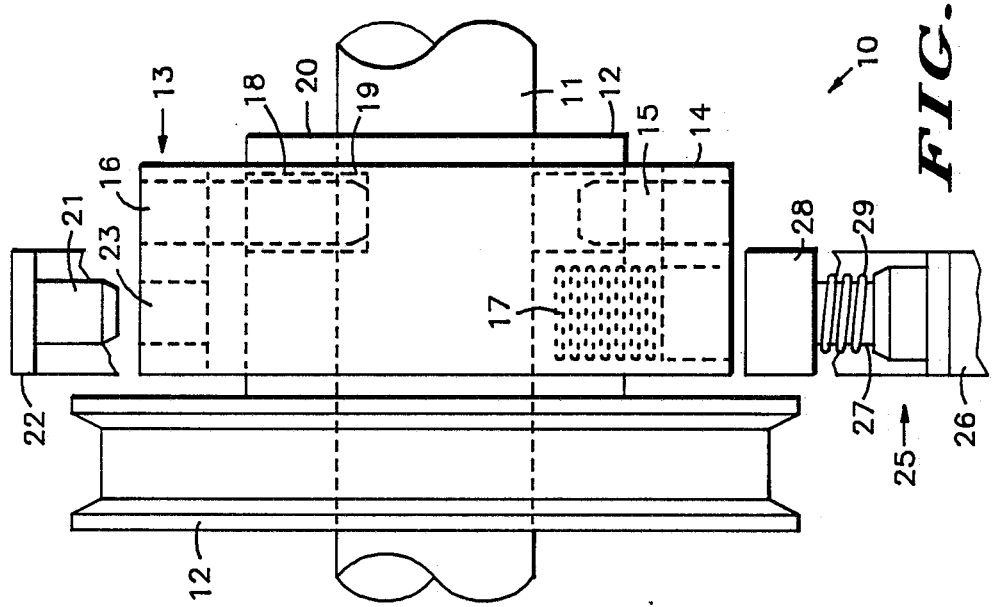

As shown in FIGS. 4 and 5, a drive means 25 for disengaging clutch 10 is illustrated. Drive means 25 is illustrated here as a solenoid 26 driving a shaft 27 having a cap 28. A spring 29 is shown disposed about shaft 27. When solenoid 26 is activated, shaft 27 is pulled into solenoid 26; spring 29 is compressed; and head 28 does not contact ring 14. When solenoid 26 is off, spring 29 forces shaft 27 out of solenoid 26; and has cap 28 contact ring 14 causing drive pin 16 to be removed from notch 19 and lock pin 21 to be inserted into hole 23. It should be noted here that solenoid 26 is but one possible drive means 25 and that a motor, air cylinder, hydraulic drive, or similar device may be utilized.

Figure 6:
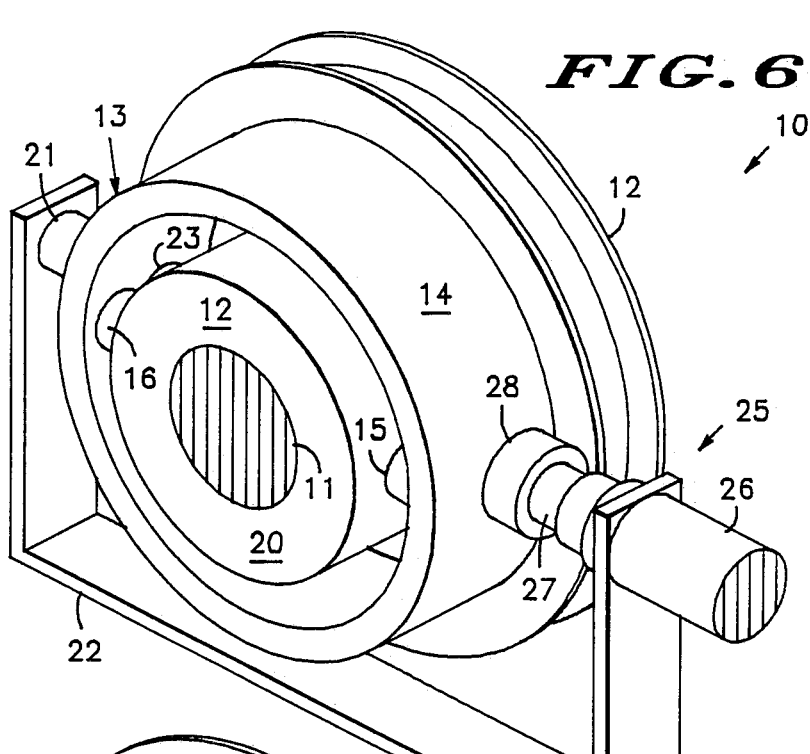
FIGS. 6 and 7 are views in prospective of an engaged and disengaged mechanical clutch embodying the present invention.
Figure 7:
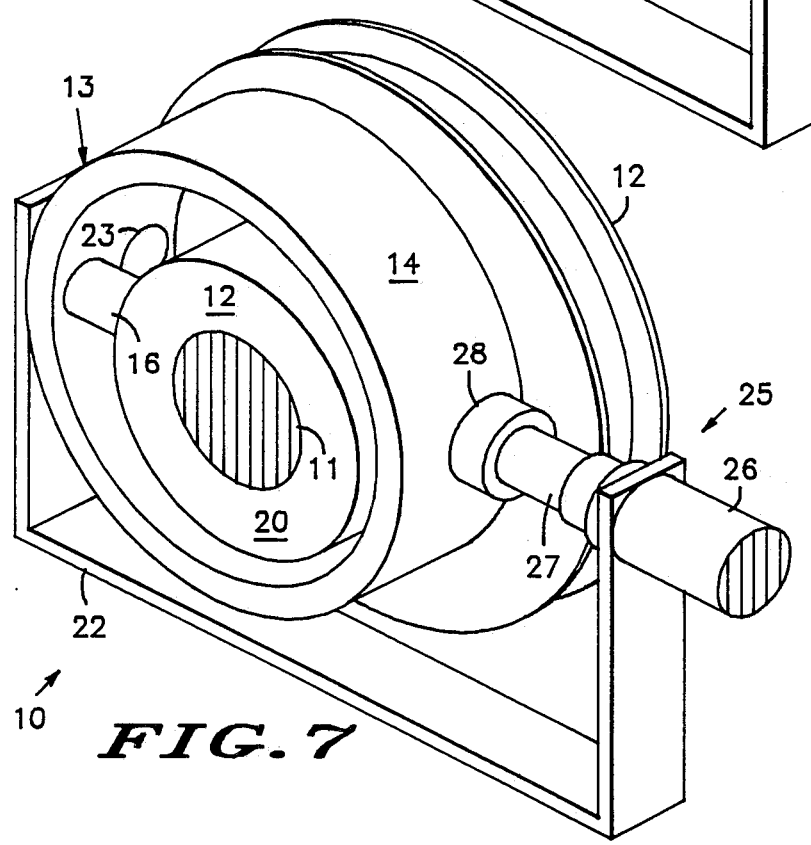

Referring now to FIGS. 6 and 7, device 10 is illustrated in engaged and disengaged positions, respectively.

Thus, after reviewing the above, it will be apparent to one skilled in the art that there has been provided in accordance with the invention, a device and method that fully satisfies the objects, aims and advantages set forth above.

While the invention has been described in conjunction with specific embodiments thereof, it is evident that many alterations, modifications, and variations will be apparent to those skilled in the art in light of the foregoing description. Accordingly, it is intended to embrace all such alterations, modifications and variations in the appended claims.

We claim:
1. A mechanical clutch comprising:
   a shaft having a notch disposed therein;
   a wheel having a hub and being disposed about said shaft, said hub defining a first hole extending from an outer wall to an inner wall and a second hole extending from said outer wall toward said inner wall;

a clutch ring being disposed about said outer wall of said hub of said wheel;

a drive pin being coupled to said clutch ring and being disposed such that when said mechanical clutch is engaged, said drive pin extends through the first hole of said hub into the notch of said shaft, and when said mechanical clutch is disengaged, said drive pin extends partly into the first hole of said hub;

spring means for exerting a force on said clutch ring causing said mechanical clutch to be engaged, said spring means being disposed within the second hole of said hub and contacting an inner wall of said clutch ring; and drive means for exerting a force on said clutch ring causing said mechanical clutch to be disengaged, said drive means being disposed to exert a force on an outer wall of said clutch ring.

2. The mechanical clutch of claim 1 further comprising a guide pin coupled to said clutch ring and being disposed within a third hole being defined by said hub extending from said outer wall toward said inner wall, the third hole being juxtaposed to said second hole.

3. The mechanical clutch of claim 1 further comprising a lock pin being disposed adjacent said clutch ring such that when said mechanical clutch is disengaged said lock pin extends into a hole defined by said clutch ring extending from said outer wall toward said inner wall.

4. The mechanical clutch of claim 1 wherein said drive pin and said spring are spaced 180° apart.

5. The mechanical clutch of claim 1 wherein said drive means comprises a solenoid having:
a housing;
a shaft being disposed in said housing;
an end cap being disposed on an end of said shaft; and
a spring being disposed about said shaft between said end cap and said housing.

6. A mechanical clutch comprising:
a shaft having a notch disposed therein;
a wheel having a hub and being disposed about said shaft, said hub defining a first hole extending from an outer wall to an inner wall and a second hole extending from said outer wall toward said inner wall;

a clutch ring being disposed about said outer wall of said hub of said wheel;

a drive pin being coupled to said clutch ring and being disposed such that when said mechanical clutch is engaged, said drive pin extends through the first hole of said hub into the notch of said shaft, and when said mechanical clutch i disengaged, said drive pin extends partly into the first hole of said hub;

spring means for exerting a force on said clutch ring causing said mechanical clutch to be engaged, said spring means being disposed within the second hole of said hub and contacting an inner wall of said clutch ring;

a guide pin coupled to said clutch ring and being disposed within a third hole being defined by said hub extending from said outer wall toward said inner wall, the third hole being juxtaposed to said second hole;

a lock pin being disposed adjacent said clutch ring such that when said mechanical clutch is disengaged, said lock pin extends into a hole defined by said clutch ring extending from said outer wall toward said inner wall; and drive means for exerting a force on said clutch ring causing said mechanical clutch to be disengaged, said drive means being disposed to exert a force on an outer wall of said clutch ring.

7. The mechanical clutch of claim 6 wherein said drive means comprises a solenoid having:
a housing;
a shaft being disposed in said housing;
an end cap being disposed on an end of said shaft; and
a spring being disposed about said shaft between said end cap and said housing.

8. The mechanical clutch of claim 1 wherein said spring and guide pin are spaced 180° apart from said drive pin.

* * * * *